(12) United States Patent
Ohhashi et al.

(10) Patent No.: US 6,857,314 B2
(45) Date of Patent: Feb. 22, 2005

(54) SYSTEM FOR DETECTING REMAINING AMOUNT OF LIQUID IN TANK

(75) Inventors: Hironori Ohhashi, Gunma (JP); Toru Mashimo, Gunma (JP); Yutaka Ogiwara, Gunma (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 0 days.

(21) Appl. No.: 10/747,250

(22) Filed: Dec. 30, 2003

(65) Prior Publication Data

US 2004/0221646 A1 Nov. 11, 2004

(30) Foreign Application Priority Data

Jan. 7, 2003 (JP) .......................................... 2003-001324

(51) Int. Cl.[7] .......................... G01F 23/60; G01F 23/32
(52) U.S. Cl. ............................ 73/313; 73/314; 73/317
(58) Field of Search .......................... 73/313, 314, 317, 73/305, 322.5

(56) References Cited

U.S. PATENT DOCUMENTS

| | | | | |
|---|---|---|---|---|
| 2,446,844 A | * | 8/1948 | Molaver ........................ | 73/317 |
| 4,184,370 A | * | 1/1980 | Schlick et al. ................. | 73/313 |

FOREIGN PATENT DOCUMENTS

JP            64-38534 U     3/1989

* cited by examiner

Primary Examiner—Hezron Williams
Assistant Examiner—Tamiko Bellamy
(74) Attorney, Agent, or Firm—Sughrue Mion, PLLC

(57) ABSTRACT

A liquid remaining-amount detecting system includes a displacement transmitting part for transmitting displacement of a float to a rotation-angle sensor and including a bracket mounted to the bottom of a tank, an arm having a base end mounted to the bracket and a front end mounted to the float, and a link mechanism for coupling the rotation-angle sensor and the base end of the arm. The link mechanism serves to cancel displacement of the float resulting from vertical displacement of the bottom of the tank.

10 Claims, 6 Drawing Sheets

SYSTEM FOR DETECTING REMAINING AMOUNT OF LIQUID IN TANK

BACKGROUND OF THE INVENTION

The present invention relates to a system for detecting the remaining amount of liquid in a tank, which is suitably used, for example, in detecting the remaining amount of fuel accumulated in an automotive fuel tank.

Typically, as disclosed in JP-U 64-38534, the fuel tank mounted on the vehicle is provided with a float-type level detecting system, for example, to detect the remaining amount of fuel accumulated in the tank. The float-type level detecting system comprises essentially a float arranged vertically movably with the level of fuel accumulated in the fuel tank, a sensor part fixedly arranged in the tank and for sensing a fuel level position in accordance with displacement of the float, and a displacement transmitting part comprising an arm for transmitting displacement of the float to the sensor part.

When fuel in the fuel tank increases or decreases, the float moves vertically with the fuel level, which is transmitted to the sensor part where the fuel remaining amount in the tank is detected in accordance with a fuel level position.

However, the typical level detecting system is constructed to detect the fuel remaining amount through the sensor part fixedly mounted to the top face of the fuel tank, to which displacement of the float moving vertically with the level of fuel in the fuel tank is directly transmitted through the arm. Such construction causes the following problem.

In recent passenger cars and the like, there is a tendency to make fuel tanks from a light flexible material such as synthetic resin so as to achieve a weight reduction in the whole car. The fuel tanks made from a light flexible material can be deformed with variations in weight of fuel accumulated therein, tank pressure, and ambient temperature, and with vibrations, impact, and the like occurring during vehicle cruising.

When the fuel tank is deformed, the level of fuel in the fuel tank is displaced vertically accordingly. Then, the above level detecting system detects and outputs the fuel remaining amount including this level displacement as variations in the fuel remaining amount, which is different from the actual fuel remaining amount, leading to impossibility of stable detection of the correct fuel remaining amount.

SUMMARY OF THE INVENTION

It is, therefore, an object of the present invention to provide a system for detecting the remaining amount of liquid in a tank, which allows continuous and stable detection of the remaining amount of liquid in the tank, and thus enhancement in the reliability of the system.

The present invention provides generally a system for detecting a remaining amount of liquid in a tank, which comprises: a float which produces a displacement with a level of liquid; a sensor part mounted to the tank at a position above a bottom thereof, the sensor part sensing the remaining amount of liquid in accordance with the displacement of the float; and a displacement transmitting part which transmits the displacement of the float to the sensor part, the displacement transmitting part comprising a support member mounted to the bottom of the tank, an arm having a base end mounted to the support member and a front end mounted to the float, and a link mechanism which couples the sensor part and the base end of the arm.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
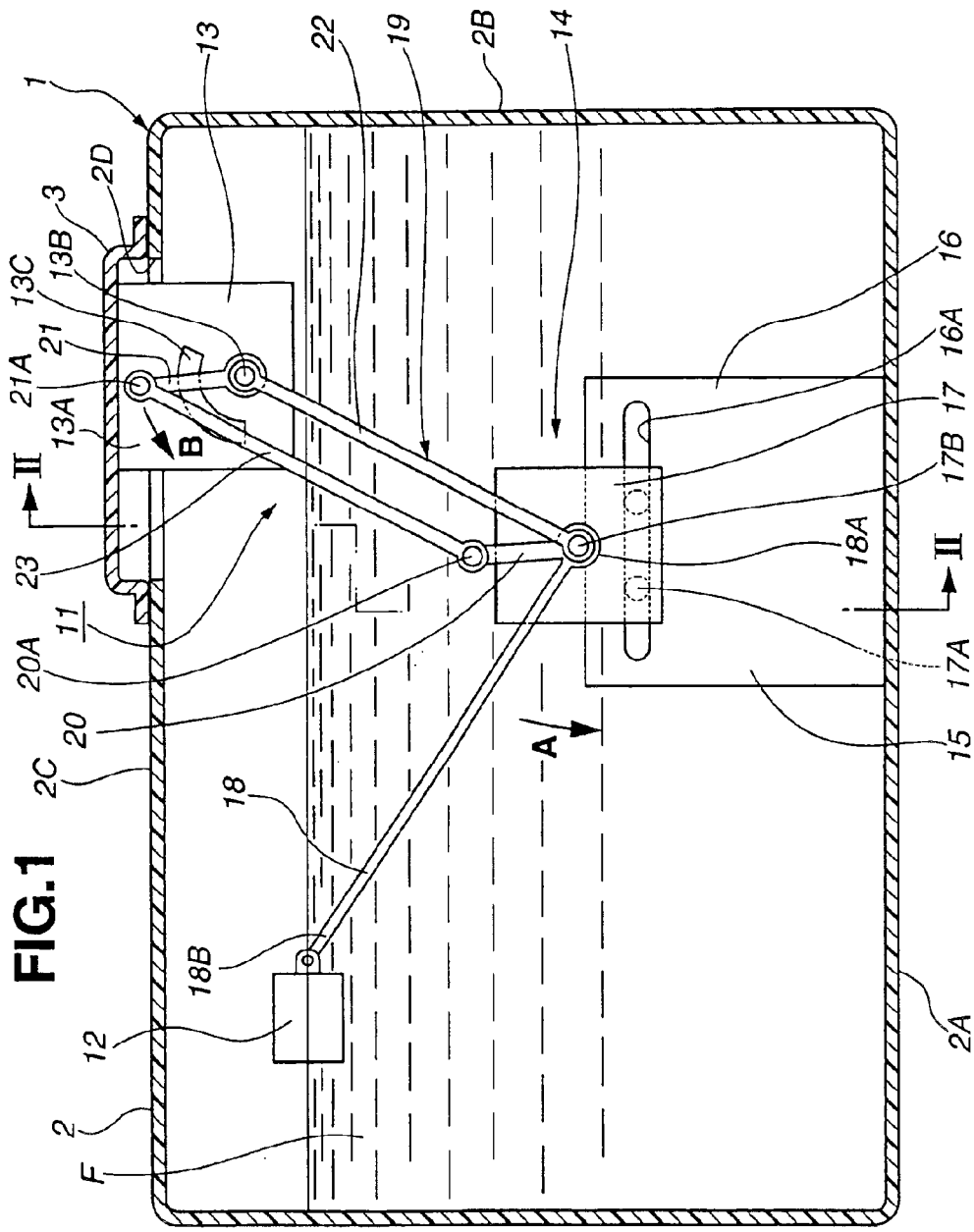
FIG. 1 is a longitudinal sectional view showing a first embodiment of a system for detecting the remaining amount of liquid in a tank according to the present invention.

Referring to the drawings wherein like reference numerals designate like parts throughout the views, a description is made about a system for detecting the remaining amount of liquid in a tank embodying the present invention.

Figure 2:
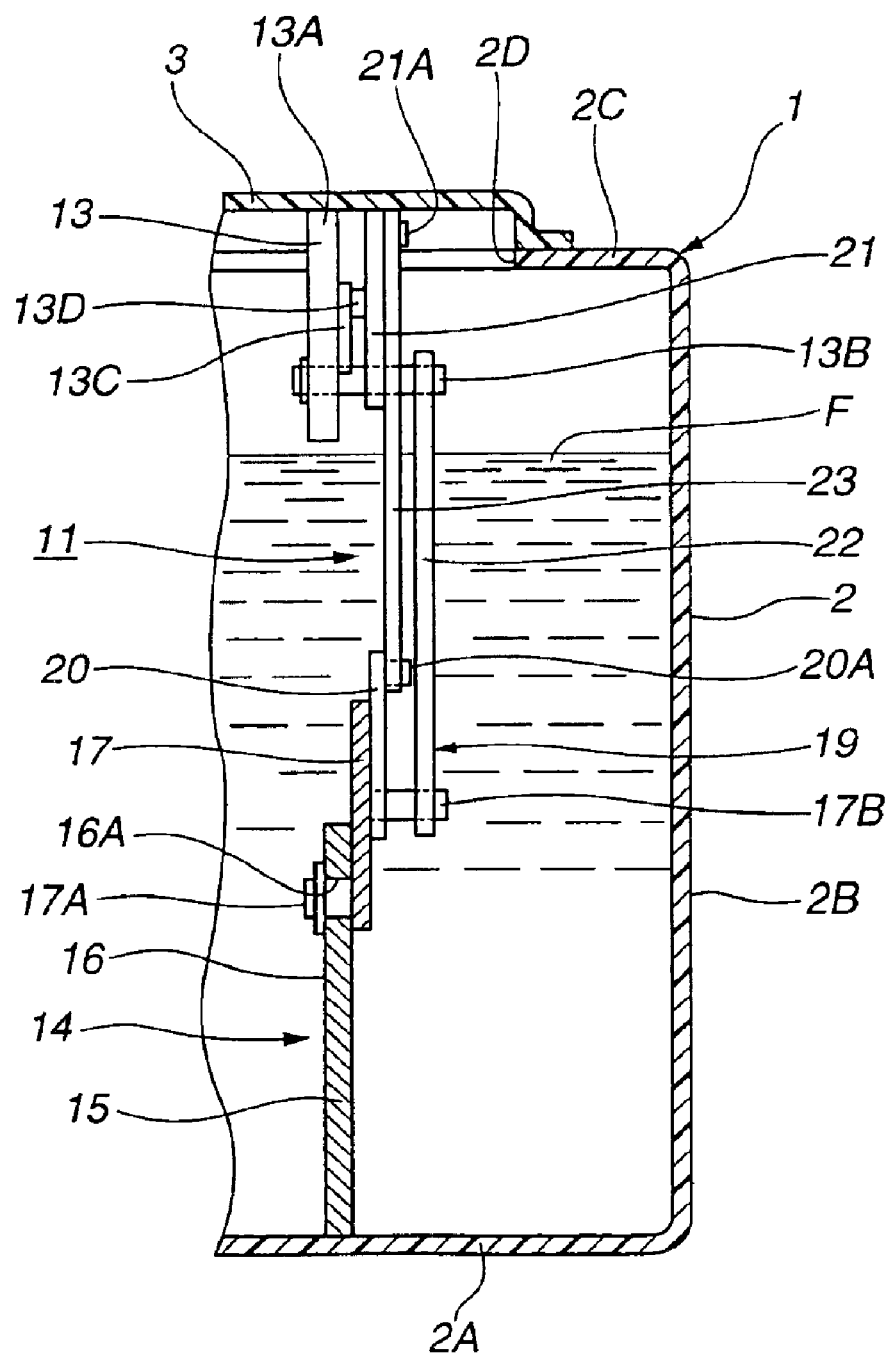
FIG. 2 is a sectional view taken along the line II—II in FIG. 1.
Figure 3:
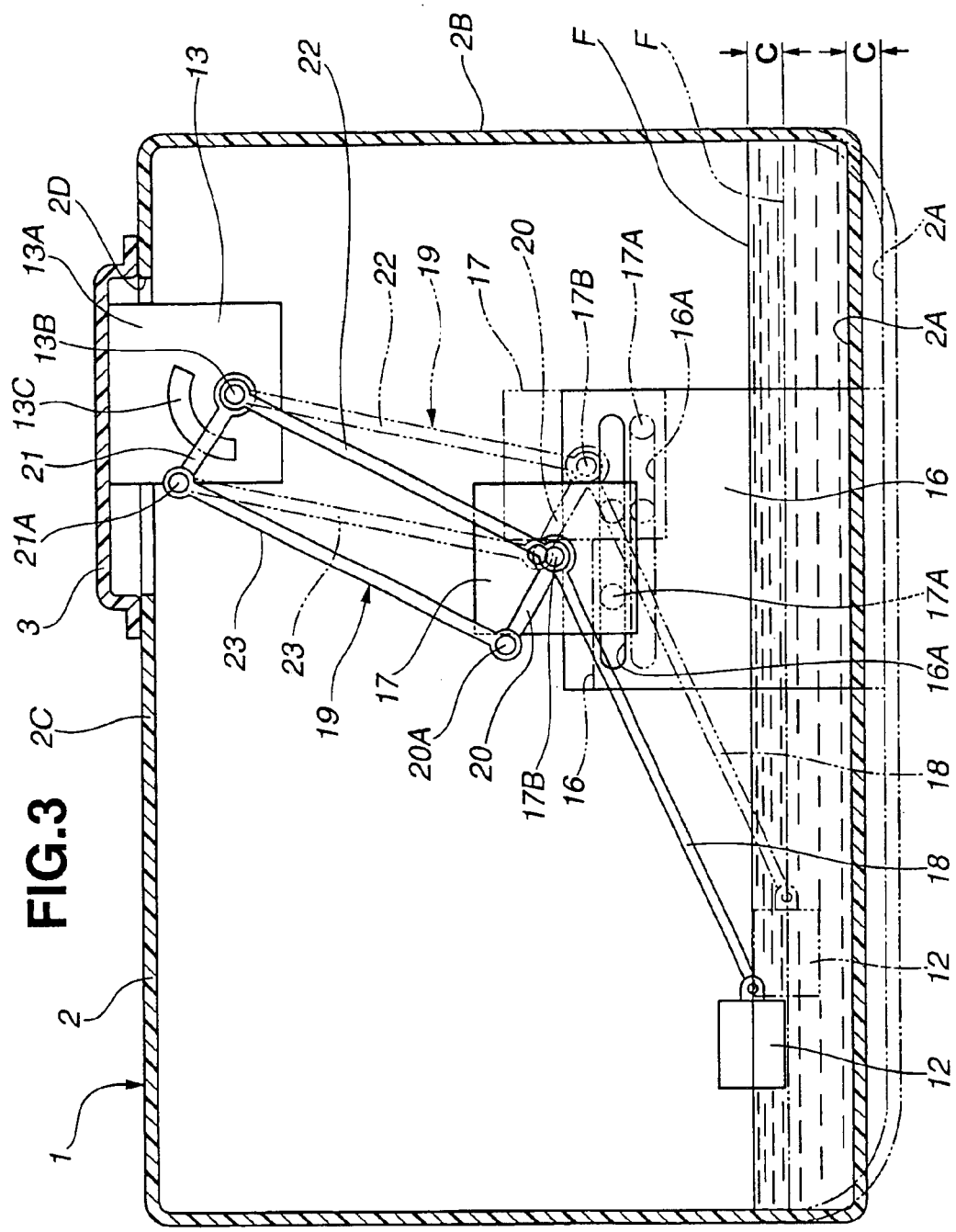
FIG. 3 is a view similar to FIG. 1, showing operation of the system in FIG. 1.

Referring to FIGS. 1–3, there is shown first embodiment of the present invention. A fuel tank 1 to be mounted on the vehicle comprises a main body 2 made from a light flexible material such as synthetic resin, and a cover plate 3 as will be described later. Fuel tank 1 comprises a mounting flange, not shown, provided to a top face 2C, an upper portion of a side face 2B, or the like of tank main body 2 as will be described later, through the use of which fuel tank 1 is fixed to a frame and the like of the vehicle.

As shown in FIG. 1, tank main body 2 comprises a bottom face 2A, side face 2B extending upward to surround bottom face 2A, top face 2C integrally formed with the upper end of side face 2B to conceal side face 2B from above, an opening 2D formed roughly in the center of top face 2C, and the like. Together with a fuel pump, not shown, a fuel remaining-amount detecting system 11 as will be described later is inserted into tank main body through opening 2D.

Cover plate 3, which constitutes fuel tank 1 together with tank main body 2, is made from substantially the same resin material as that of tank main body 2. Cover plate 3 serves to close opening 2D of tank main body 2 from above. A rotation-angle sensor 13 as will be described later is fixed on the underside of cover plate 3 facing the inside of tank main body 2.

Fuel remaining-amount detecting system 11, which forms a system for detecting the remaining amount of liquid in the embodiment, serves to detect the remaining amount of a fuel F accumulated in fuel tank 1. System 11 comprises a float 12 as will be described later, rotation-angle sensor 13, a displacement transmitting part 14, and the like.

Float 12 is mounted at the front end of an arm 18 as will be described later, and moves vertically with the level of fuel F accumulated in fuel tank 1.

Rotation-angle sensor or sensor part 13 is fixedly arranged in fuel tank 1 above bottom face 2A, and serves to sense the angle of rotation electrically, magnetically, or optically. As shown in FIGS. 1 and 2, rotation-angle sensor 13 comprises essentially a base plate 13A fixed on the underside of cover plate 3, a rotation shaft 13B rotatably mounted to base plate 13A, a resistor 13C circularly formed about rotation shaft 13B, and a conductive slider 13D fixed to a second lever 21 as will be described later to make slide contact with resistor 13C.

Displacement of float 12 is transmitted through second lever 21 and the like to slider 13D, which moves on resistor 13C in a sliding way, obtaining a change in a value of resistance of resistor 13C in accordance with displacement of float 12. Rotation-angle sensor 13 senses a level position or remaining amount of fuel F in accordance with a value of resistance of resistor 13C.

Displacement transmitting part 14 serves to transmit displacement of float 12 to rotation-angle sensor 13, and comprises a bracket 15 as will be described later, arm 18, a link mechanism 19, and the like.

Bracket or support member 15 is arranged on bottom face 2A of tank main body 2, and comprises a stationary portion or stationary support portion 16 fixedly mounted to bottom face 2A and a movable portion or movable support portion 17 movably mounted to stationary portion 16.

Stationary bracket portion 16 is shaped like a rectangular plate, and is arranged to extend upward from bottom face 2A of tank main body 2. A slot 16A is formed in the upper end of stationary bracket portion 16 to extend horizontally in parallel to bottom face 2A. On the other hand, movable bracket portion 17 is shaped like a rectangular plate smaller than that of stationary bracket portion 16, and has a lower end having two guide pins 17A protruding therefrom. Movable bracket portion 17 is slidably engaged in slot 16A of stationary bracket portion 16, and can move horizontally while being guided therein. A pin 17B is arranged in the center of movable bracket portion 17 to protrude in the direction opposite to stationary bracket portion 16.

Arm 18 has a base end 18A rotatably supported by pin 17B of movable bracket portion 17, and a front end or free end 18B mounted to float 12. A first lever 20 as will be described later is integrated with base end 18A of arm 18.

Link mechanism 19 is arranged between rotation-angle sensor 13 and base end 18A of arm 18, and include a parallel link comprising first lever 20, a second lever 21, a first rod 22, a second rod 23, and the like as will be described later. Link mechanism 19 serves to transmit displacement of float 12 which moves with the level of fuel F to rotation-angle sensor 13 through arm 18.

First lever 20 is integrated with base end 18A of arm 18, and forms a given angle with arm 18. First lever 20 rotates, together with arm 18, about pin 17B of movable bracket portion 17. A pin 20A is protrusively arranged at the front end of first lever 20.

Second lever 21 is fixedly mounted to rotation shaft 13B of rotation-angle sensor 13, and has substantially the same length as that of first lever 20. As shown in FIG. 2, slider 13D is fixed to second lever 21 in a portion facing resistor 13C of rotation-angle sensor 13. A pin 21A is protrusively arranged at the front end of second lever 21.

First rod 22 is arranged between rotation shaft 13B of rotation-angle sensor 13 and pin 17B of movable bracket portion 17, and has one end rotatably mounted to rotation shaft 13 and another end rotatably mounted to pin 17B.

Second rod 23 is arranged between first lever 20 and second lever 21, and has substantially the same length as that of first lever 22. Second lever 23 has one end rotatably mounted to pin 20A of first lever 20 and another end rotatably mounted to pin 21A of second lever 21.

When the level of fuel F accumulated in fuel tank 1 is displaced from a position shown by solid line in FIG. 1 to a position shown by solid line in FIG. 3 to cause displacement of float 12 with the fuel level. Then, arm 18 rotates in the direction of an arrow A about pin 17B of movable bracket portion 17. First lever 20 causes rotation together with arm 18, which is transmitted to second lever 21 through second rod 23. Second lever 21 rotates in the direction of an arrow B about rotation shaft 13B. With this, slider 13D fixed to second lever 21 moves on resistor 13C of rotation-angle sensor 13 in a sliding way.

Next, operation of fuel remaining-amount detecting system 11 is described. Using a fuel pump, not shown, fuel F accumulated in fuel tank 1 is discharged to the outside of fuel tank 1 for supply to an automotive engine, for example. Fuel F in fuel tank 1 reduces gradually in accordance with consumption in the engine, having the level lowering accordingly.

When filling fuel tank 1 with fuel F at a service station and the like, not shown, fuel F is gradually accumulated in fuel tank 1 by this filling amount, having the level increasing upward.

When the level of fuel F accumulated in fuel tank 1 is displaced from the position shown by solid line in FIG. 1 to the position shown by solid line in FIG. 3 due to consumption of fuel F, float 12 moves downward with the fuel level. Displacement of float 12 causes arm 18 and first lever 20 integrated with base end 18A of arm 18 to rotate in the direction of arrow A about pin 17B of movable bracket portion 17.

Since link mechanism 19 includes a parallel link, second lever 21 coupled to first lever 20 through second rod 23 rotates in the direction of arrow B by the same angle of rotation as that of first lever 20 about rotation shaft 13B of rotation-angle sensor 13. With this, slider 13D fixed to second lever 21 moves on resistor 13C of rotation-angle sensor 13 in a sliding way.

Thus, rotation-angle sensor 13 can sense a level position of fuel F in accordance with a value of resistance of resistor 13C, from which the remaining amount of fuel F accumulated in fuel tank 1 can be determined.

When the level of fuel F is located at a position shown by solid line in FIG. 3, and that tank main body 2 is deformed due to pressure variations in fuel tank 1 or the like to cause downward displacement of bottom face 2A by a distance C, a level position of fuel F accumulated in fuel tank 1 is also displaced downward with displacement of bottom face 2A as shown by two-dot chain line in FIG. 3.

A description is made about an example where displacement of the level of fuel F is equal to distance C. Then, stationary bracket 16 and movable bracket 17 move downward with displacement of bottom face 2A. However, since guide pins 17A of movable bracket portion 17 are slidably engaged in slot 16A of stationary bracket portion 16, and pin 17B of movable bracket portion 17 is coupled to rotation shaft 13B of rotation-angle sensor 13 through first rod 22, movable bracket portion 17 rotates about rotation shaft 13B, and moves horizontally with respect to stationary bracket portion 16 while being guided in slot 16A. With this, referring to FIG. 3, first lever 20, first rod 22, and second rod 23 which constitute link mechanism 19 are displaced from a position shown by solid line to a position shown by two-dot chain line.

Since link mechanism 19 includes a parallel link, second lever 21 constituting link mechanism 19 holds the position shown by solid line in FIG. 3, i.e. position before displacement of bottom face 2A, regardless of displacement of first lever 20, first rod 22, and second rod 23. Thus, slider 13D fixed to second lever 21 does not move on resistor 13C of rotation-angle sensor 13, allowing a resistance of resistor 13 to be held at a given value.

With this, when the level of fuel F is displaced with deformation of fuel tank 1, displacement part of float 12 due to deformation of fuel tank 1 can be canceled by link mechanism 19, preventing erroneous transmission of displacement of float 12 to rotation-angle sensor 13.

Thus, in the first embodiment, bracket 15 is arranged on bottom face 2A of fuel tank 1, and base end 18A of arm 18 having float 12 at front end 18B is rotatably mounted to pin 17B of movable bracket portion 17 which constitutes bracket 15. And base end 18A of arm 18 and rotation-angle sensor 13 are coupled by link mechanism 19.

With this, even if fuel tank 1 is deformed, displacement part of float 12 due to deformation thereof can be canceled by link mechanism 19 and the like, allowing stable detection of the correct remaining amount of fuel F in fuel tank 1 with influence of deformation of fuel tank 1 eliminated. Therefore, the detection accuracy of the remaining amount of fuel F can be increased, resulting in enhanced reliability of fuel remaining-amount detecting system 11.

If displacement of bottom face 2A due to deformation of fuel tank 1 (distance C in FIG. 3, for example) does not correspond to that of the level of fuel F (distance C) in a 1:1 ratio, the length or the like of levers 20, 21 is adjusted in accordance with a ratio produced at each fuel tank 1 to appropriately set operation of link mechanism 19. With this, erroneous transmission of displacement of float 12 to rotation-angle sensor 13 can be prevented in the same way as described above. Moreover, even if displacement detected at bottom face 2A of tank main body 2 does not linearly correspond to that of the level of fuel F produced accordingly, setting of an appropriate approximate value allows achievement of accurate following of the apparatus.

Figure 4:
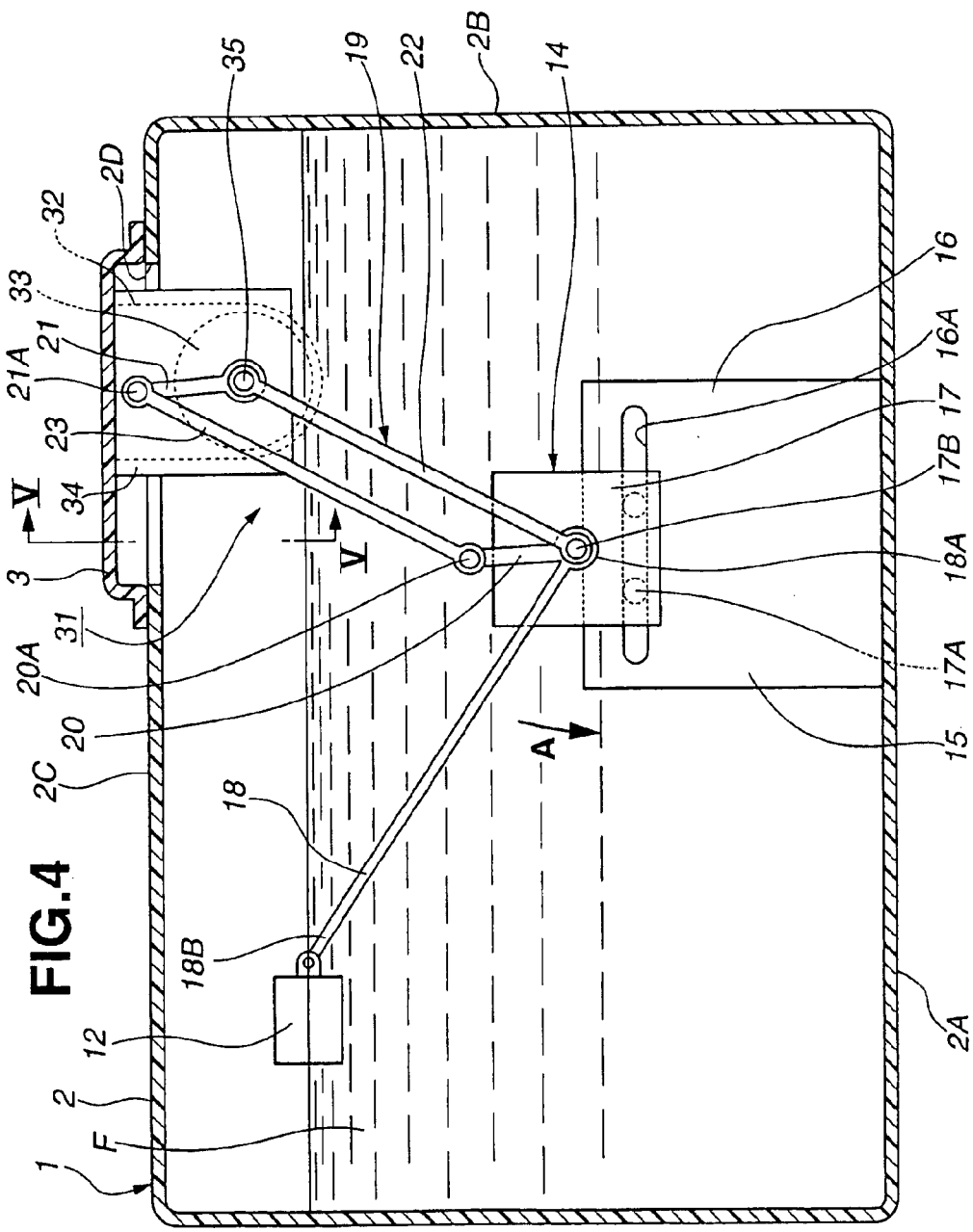
FIG. 4 is a view similar to FIG. 3, showing a second embodiment of the present invention.
Figure 5:
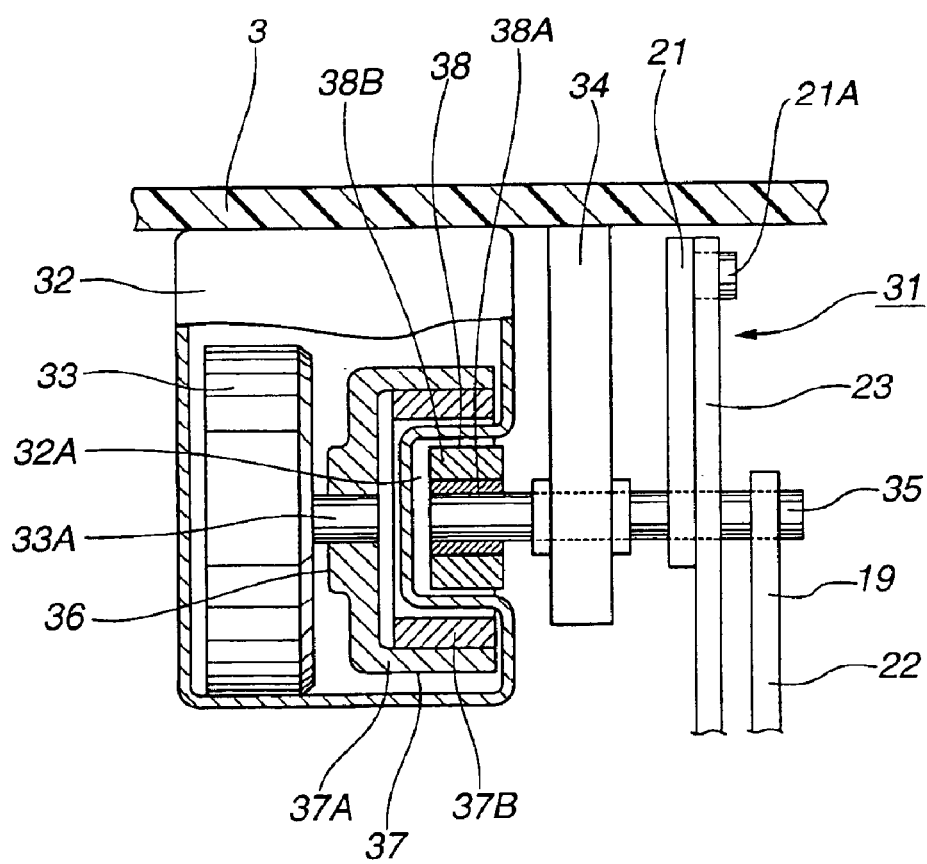
FIG. 5 is a view similar to FIG. 2, taken along the line V—V in FIG. 4.

Referring to FIGS. 4 and 5, there is shown second embodiment of the present invention which is substantially the same as the first embodiment except that a sensor casing hermetically isolated from fuel is arranged in the fuel tank to accommodate therein a sensor part.

Specifically, a fuel remaining-amount detecting system 31 is arranged in fuel tank 1, and has roughly the same structure as that of fuel remaining-amount detecting system 11 in the first embodiment, comprising float 12, displacement transmitting part 14, a sensor casing 32, a rotation-angle sensor 33 as will be described later, and the like.

Sensor casing 32 is arranged in fuel tank 1 and fixed on the under face of cover plate 3. As shown in FIG. 5, sensor casing 32 is formed as a box hermetically isolated from fuel F in fuel tank 1 to accommodate therein rotation-angle sensor 33. A bottomed concave cylindrical portion 32A is formed in the side face of sensor casing 32 to protrude inward of sensor casing 32.

Rotation-angle sensor or sensor part 33 is disposed in sensor casing 32, and comprises a rotation shaft 33A to which displacement of float 12 is transmitted through a shaft 35, a magnet coupling 36 as will be described later, and the like. Rotation-angle sensor 33 serves to electrically or magnetically sense, for example, the angle of rotation of rotation shaft 33A through the use of a detection element, not shown, in accordance with which a level position of fuel F, i.e. the remaining amount of fuel F in fuel tank 1 is determined.

A shaft support plate 34 is fixed on the underside of cover plate 3 to face concave cylindrical portion 32A of sensor casing 32. An axially middle portion of shaft 35 is rotatably supported at the lower end of shaft support plate 34. Shaft 35 has one end to which second lever 21 constituting link mechanism 19 is fixed and first rod 22 is mounted rotatably, and another end extending into concave cylindrical portion 32A of sensor casing 32.

Magnet coupling or non-contact coupling 36 is arranged between rotation shaft 33A of rotation-angle sensor 33 and another end of shaft 35, and comprises a female portion 37 fixed to rotation shaft 33A of rotation-angle sensor 33 and a male portion 38 fixed to another end of shaft 35. Magnet coupling 36 serves to transmit rotation of shaft 35 to rotation shaft 33A of rotation-angle sensor 33 in a non-contact way with concave cylindrical portion 32A of sensor casing 32 held between female and male coupling portions 37, 38.

Female coupling portion 37 comprises a magnet mounting cylinder 37A formed like a lidded cylinder to surround concave cylindrical portion 32A of sensor casing 32 and fixed to rotation shaft 33A, and an outer magnet 37B having S and N poles circumferentially alternately disposed on the inner peripheral surface of magnet mounting cylinder 37A. On the other hand, male coupling portion 38 comprises a magnet mounting cylinder 38A located at the inner periphery of concave cylindrical portion 32A of sensor casing 32 and engaged on another end of shaft 35, and an inner magnet 38B having S and N poles circumferentially alternately disposed on the outer peripheral surface of magnet mounting cylinder 38A.

With magnet coupling 36, outer magnet 37B of female coupling portion 37 and inner magnet 38B of male magnet 38 are attracted to each other across concave cylindrical portion 32A of sensor casing 32, obtaining rotation of female coupling portion 37 together with male coupling portion 38. With this, displacement of float 12 can be transmitted to rotation shaft 33A of rotation-angle sensor 33 hermetically accommodated in sensor casing 32 through arm 18, link mechanism 19, shaft 35, magnet coupling 36, and the like.

Operation of fuel remaining-amount detecting system 31 is fundamentally the same as that of fuel remaining-amount detecting system 11 described in the first embodiment.

In the second embodiment, rotation-angle sensor 3 for sensing the remaining amount of fuel F in fuel tank 1 is disposed in sensor casing 32 hermetically isolated from fuel F in fuel tank 1. And rotation shaft 33A of rotation-angle sensor 3 and second lever 21 of link mechanism 19 are coupled through non-contact coupling 36.

Thus, even if the level of fuel F accumulated in fuel tank 1 waves greatly during vehicle cruising or the like, sensor casing 32 can surely prevent fuel F from adhering to rotation-angle sensor 33. With this, corrosion of rotation-angle sensor 33 due to adhesion of fuel F can be restraint, allowing rotation-angle sensor 33 to carry out accurate detection of the remaining amount of fuel F over the long term.

Having described the present invention in connection with the illustrative embodiments, it is noted that the present invention is not limited thereto, and various change and modifications can be made without departing from the scope of the present invention.

Figure 6:
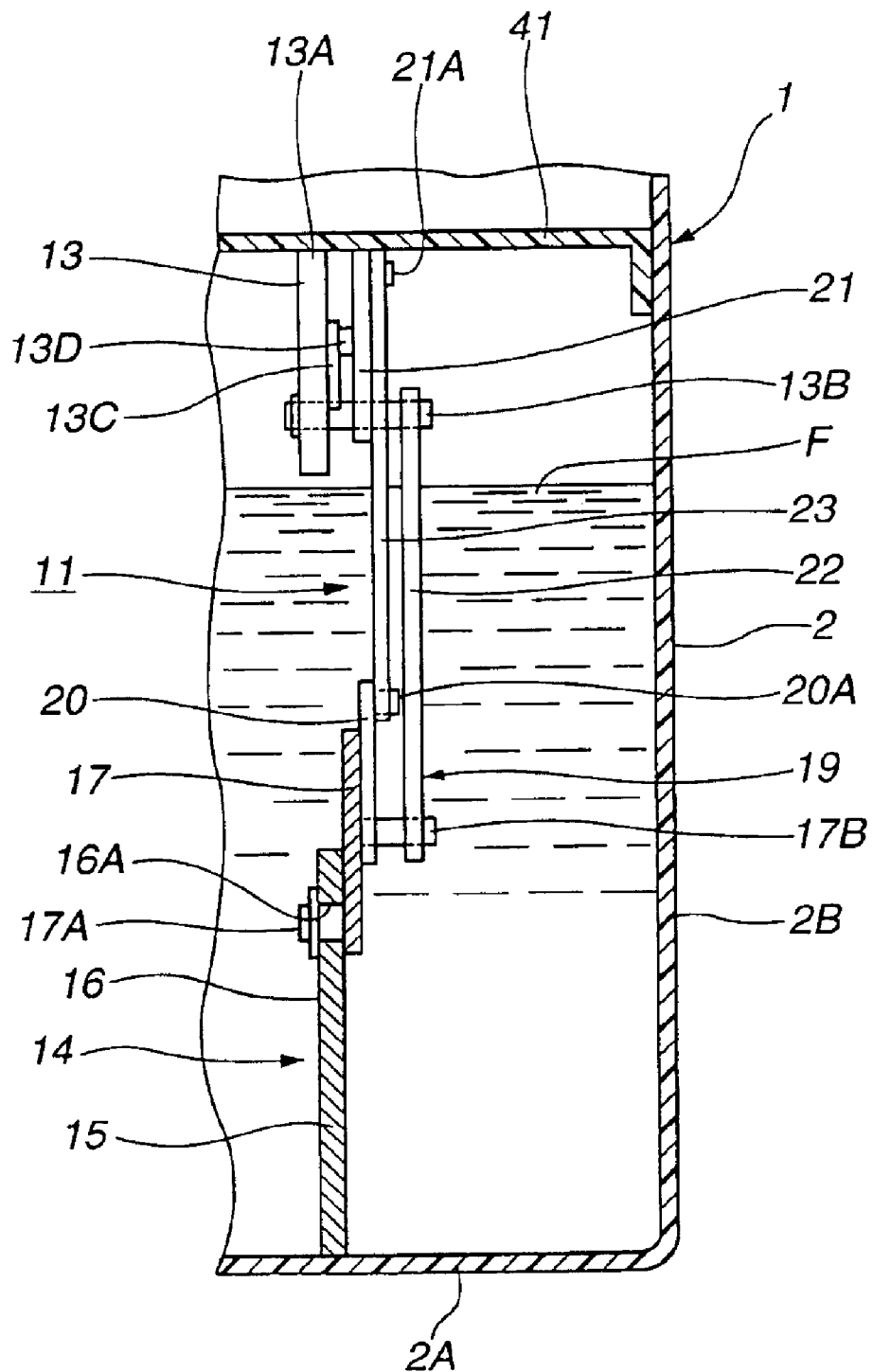
FIG. 6 is a fragmentary enlarged sectional view showing a variation of the first embodiment.

By way of example, in the first embodiment, rotation-angle sensor 33 is fixed to top face 2C of fuel tank 1 through cover plate 3. Optionally, referring to FIG. 6, rotation-angle sensor 13 may be fixed to side face 2B of fuel tank 1. In this variation, there is arranged a sensor support plate 41 fixed to side face 2B of fuel tank 1, through which rotation-angle sensor 13 is fixed to side face 2B.

Further, in the second embodiment, sensor casing 32 is disposed in fuel tank 1. Optionally, the sensor casing may be arranged outside fuel tank 1 wherein rotation-angle sensor 13 disposed in the sensor casing and link mechanism 19 are coupled through non-contact coupling 36.

Still further, in the second embodiment, magnet coupling 36 is adopted to transmit rotation of shaft 35 to rotation shaft 33A of rotation-angle sensor 33. Alternatively, other means such as Hall element may be applied to that end.

Furthermore, in the illustrative embodiments, first rod 22 constituting link mechanism 19 is connected to rotation shaft 13B of rotation-angle sensor 13 and pin 17B of movable bracket portion 17. Alternatively, first rod 22 may be connected to a pin provided to any member other than rotation shaft 13B and a pin provided to any member other than movable bracket portion 17.

Further, in the illustrative embodiments, movable bracket portion 17 is movably mounted to stationary bracket portion 16. Optionally, movable bracket portion 17 may be mounted to other member arranged in fuel tank 1, the inner surface of tank main body 2, or the like.

Still further, in the illustrative embodiments, rotatably mounted to base plate 13A of rotation-angle sensor 13 is rotation shaft 13B, to which second lever 21 constituting link mechanism 19 is fixed. Optionally, there may be arranged a shaft fixedly mounted to base plate 13A, to which second lever 21 is mounted rotatably.

Still further, in the illustrative embodiments, pin 17B is protrusively provided to movable bracket portion 17 so as to rotatably support base end 18A of arm 18. Alternatively, a separate and distinct pin from movable bracket portion 17 may be adopted to couple movable bracket portion 17 and base end 18A of arm 18. The same can be applied to pin 20A of first lever 20 and pin 21A of second lever 21.

Furthermore, in the illustrative embodiments, the present invention is applied to the system for detecting the remaining amount of fuel F accumulated in fuel tank 1. Optionally, the present invention can be applied to systems for detecting the remaining amount of liquid accumulated in a tank, such as working fluid, chemical agent, or the like. The entire contents of Japanese Patent Application P2003-001324 filed Jan. 7, 2003 are incorporated hereby by reference.

What is claimed is:

1. A system for detecting a remaining amount of liquid in a tank, comprising:
   a float which produces a displacement with a level of liquid;
   a sensor part mounted to the tank at a position above a bottom thereof, the sensor part sensing the remaining amount of liquid in accordance with the displacement of the float; and
   a displacement transmitting part which transmits the displacement of the float to the sensor part, the displacement transmitting part comprising a support member mounted to the bottom of the tank, an arm having a base end mounted to the support member and a front end mounted to the float, and a link mechanism which couples the sensor part and the base end of the arm.

2. The system as claimed in claim 1, wherein the link mechanism serves to cancel the displacement of the float resulting from a vertical displacement of the bottom of the tank.

3. The system as claimed in claim 1, wherein the support member of the displacement transmitting part comprises a stationary portion mounted to the bottom of the tank and a movable portion mounted to the base end of the arm.

4. The system as claimed in claim 3, wherein the movable portion is horizontally movably mounted to the stationary portion.

5. The system as claimed in claim 1, wherein the link mechanism comprises a parallel link.

6. The system as claimed in claim 1, further comprising a sensor casing provided to the tank, the sensor casing accommodating the sensor part.

7. The system as claimed in claim 6, wherein the sensor casing is arranged in the tank to hermetically be isolated from liquid therein.

8. The system as claimed in claim 6, further comprising a non-contact coupling for coupling the link mechanism and the sensor part in the sensor casing.

9. A system for detecting a remaining amount of liquid in a tank, comprising:
   a float which produces a displacement with a level of liquid;
   a sensor part mounted to the tank at a position above a bottom thereof, the sensor part sensing the remaining amount of liquid in accordance with the displacement of the float;
   a displacement transmitting part which transmits the displacement of the float to the sensor part, the displacement transmitting part comprising a support member mounted to the bottom of the tank, an arm having a base end mounted to the support member and a front end mounted to the float, and a link mechanism which couples the sensor part and the base end of the arm, the link mechanism canceling the displacement of the float resulting from a vertical displacement of the bottom of the tank;
   a sensor casing arranged in the tank to hermetically be isolated from liquid therein, the sensor casing accommodating the sensor part; and
   a non-contact coupling which couples the link mechanism and the sensor part in the sensor casing.

10. An arrangement, comprising:
    a tank having a remaining amount of liquid:
    a float which produces a displacement with a level of liquid;
    a sensor part mounted to the tank at a position above a bottom thereof, the sensor part sensing the remaining amount of liquid in accordance with the displacement of the float; and
    a displacement transmitting part which transmits the displacement of the float to the sensor part, the displacement transmitting part comprising a support member mounted to the bottom of the tank, an arm having a base end mounted to the support member and a front end mounted to the float, and a link mechanism which couples the sensor part and the base end of the arm, the link mechanism canceling the displacement of the float resulting from a vertical displacement of the bottom of the tank.

* * * * *